United States Patent
Lee et al.

(10) Patent No.: US 11,186,658 B2
(45) Date of Patent: Nov. 30, 2021

(54) VINYL CHLORIDE-BASED POLYMER AND PREPARATION METHOD THEREOF

(71) Applicant: LG CHEM, LTD., Seoul (KR)

(72) Inventors: Se Woong Lee, Daejeon (KR); Seong Yong Ahn, Daejeon (KR); Kun Ji Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 16/959,779

(22) PCT Filed: Aug. 7, 2019

(86) PCT No.: PCT/KR2019/009907
§ 371 (c)(1),
(2) Date: Jul. 2, 2020

(87) PCT Pub. No.: WO2020/060028
PCT Pub. Date: Mar. 26, 2020

(65) Prior Publication Data
US 2020/0362066 A1  Nov. 19, 2020

(30) Foreign Application Priority Data

Sep. 21, 2018 (KR) .................. 10-2018-0113823
Aug. 2, 2019 (KR) .................. 10-2019-0094160

(51) Int. Cl.
| | |
|---|---|
| *C08F 14/06* | (2006.01) |
| *C08F 4/34* | (2006.01) |
| *C08F 114/06* | (2006.01) |
| *C08F 214/06* | (2006.01) |

(52) U.S. Cl.
CPC ............. *C08F 14/06* (2013.01); *C08F 4/34* (2013.01); *C08F 114/06* (2013.01); *C08F 214/06* (2013.01)

(58) Field of Classification Search
None
See application file for complete search history.

(56) References Cited

U.S. PATENT DOCUMENTS

| | | |
|---|---|---|
| 2016/0038910 A1 | 2/2016 | Lee |
| 2016/0311943 A1 | 10/2016 | Youk et al. |
| 2018/0355078 A1 | 12/2018 | Ahn et al. |

FOREIGN PATENT DOCUMENTS

| | | |
|---|---|---|
| CN | 105164165 A | 12/2015 |
| CN | 105916892 A | 8/2016 |
| CN | 108290978 A | 7/2018 |
| JP | 2008-184602 A | 8/2008 |
| KR | 10-2009-0039117 A | 4/2009 |
| KR | 10-2010-0023340 A | 3/2010 |
| KR | 10-2011-0006223 A | 1/2011 |
| KR | 10-2016-0061126 A | 5/2016 |
| KR | 10-2017-0000256 A | 1/2017 |

*Primary Examiner* — Richard A Huhn
(74) *Attorney, Agent, or Firm* — Dentons US LLP

(57) ABSTRACT

The present disclosure provides a method of preparing a vinyl chloride-based polymer having improved processability due to excellent blendability, and the vinyl chloride-based polymer having a particle non-uniformity of 10 or more defined by Equation 1.

$$\text{Particle non-uniformity } [E(X)] = \frac{1}{50}\sum_{i=1}^{50} X_i \quad \text{[Equation 1]}$$

11 Claims, 1 Drawing Sheet

VINYL CHLORIDE-BASED POLYMER AND PREPARATION METHOD THEREOF

CROSS-REFERENCE TO RELATED APPLICATIONS

This application claims the benefit of Korean Patent Application Nos. 10-2018-0113823, filed on Sep. 21, 2018, and 10-2019-0094160, filed on Aug. 2, 2019, in the Korean Intellectual Property Office, the disclosures of which are incorporated herein in their entirety by reference.

TECHNICAL FIELD

The present disclosure relates to a vinyl chloride-based polymer having excellent blendability and improved processability by controlling the surface non-uniformity of a particle, and a preparation method thereof.

BACKGROUND ART

A vinyl chloride-based polymer is a polymer containing more than 50% of vinyl chloride, which is inexpensive, and the hardness thereof is easy to control. Therefore, it is possible to apply the vinyl chloride-based polymer to most processing devices so that the application field thereof is diverse. Furthermore, the vinyl chloride-based polymer may provide molded articles excellent in physical and chemical properties, for example, mechanical strength, weather resistance, chemical resistance, and the like, and thus, are widely used in various fields.

Meanwhile, a vinyl chloride-based polymer is blended with auxiliary raw materials to be applied in various fields. In this case, when the surface of a vinyl chloride-based polymer particle is smooth, the binding force with the auxiliary raw materials may be poor, resulting in the deterioration in blendability and poor processability.

Such a vinyl chloride-based polymer is prepared through bulk polymerization, suspension polymerization or emulsion polymerization to be used depending on the purpose thereof. Among the above, unlike the suspension polymerization or emulsion polymerization, the preparation through bulk polymerization is performed using a vinyl chloride-based monomer, an initiator, and other reaction additives without using a medium such as water, so that a drying process is not required. Therefore, the preparation through bulk polymerization has relatively low production costs, and thus, is widely used in the industry.

However, most vinyl chloride-based polymer particles produced by bulk polymerization have smooth and angular surfaces (see FIG. 1), and thus, when compared with a vinyl chloride-based polymer prepared by suspension polymerization, thereby having a non-uniform surface (see FIG. 2), has low binding force with auxiliary raw materials during a blending process. As a result, blended materials are agglomerated, resulting in poor processability.

Therefore, in order to further increase the industrial applicability of a vinyl chloride-based polymer prepared through bulk polymerization, which is advantageous in terms of production costs, there is a need for a method for roughening the particle surface of the vinyl chloride-based polymer prepared through bulk polymerization.

DISCLOSURE OF THE INVENTION

Technical Problem

An aspect of the present invention provides a vinyl chloride-based polymer having excellent processability with the controlled surface non-uniformity of a particle.

Another aspect of the present invention provides a method for preparing the vinyl chloride-based polymer.

Technical Solution

According to an aspect of the present invention, there is provided a vinyl chloride-based polymer having a particle non-uniformity of 10 or greater defined by Equation 1 below.

$$\text{Particle non-uniformity } [E(X)] = \frac{1}{50}\sum_{i=1}^{50} X_i \quad \text{[Equation 1]}$$

In Equation 1 above, $X_i$ is the standard deviation of the diameter of the i-th particle, and is a value defined by Equation 2 below, $$X_i(\text{Standard deviation}) = \sqrt{\frac{\sum_{n=i}^{50}(A_n - 100)^2}{50}} \quad \text{[Equation 2]}$$

In Equation 2 above, $A_n$ is the correction value of the diameter of the i-th particle at n-th measurement, and the correction value is a value defined by Equation 3 below, $$A_n(\text{Correction value}) = 100\frac{D_n}{D_o} \quad \text{[Equation 3]}$$

In Equation 3 above, $D_n$ is the diameter of the i-th particle at n-th measurement, $D_0$ is the longest diameter of the i-th particle, and n is an integer of 1 to 50.

According to another aspect of the present invention, there is provided a method for preparing the vinyl chloride-based polymer having a particle non-uniformity of 10 or greater defined by Equation 1 below, the method including adding a pre-polymerization initiator to a first vinyl chloride-based monomer and performing pre-polymerization at a pressure in the range of 8.0 K/G to 8.7 K/G to form a particle nucleus (Step 1), and performing post-polymerization on a second vinyl chloride-based monomer and a post-polymerization initiator in the presence of the particle nucleus (Step 2), wherein the pre-polymerization initiator is added at a pressure from 1.3 K/G to 3.5 K/G lower than the pressure during the pre-polymerization.

Advantageous Effects

A vinyl chloride-based polymer according to the present disclosure is prepared through the above-described preparation method in which pressure conditions and pre-polymerization initiator addition point of time are controlled during pre-polymerization, so that particle non-uniformity may be controlled, and a high porosity may be obtained. As a result, blendability is improved so that excellent processability can be provided.

In addition, a method for preparing a vinyl chloride-based polymer according to the present disclosure is capable of controlling the surface of a particle nucleus at the beginning of a reaction by controlling pressure during pre-polymerization in a pre-polymerization step of forming the particle nucleus and by adding a pre-polymerization initiator at a pressure from 1.3 K/G to 3.5 K/G lower than the pressure during the pre-polymerization to allow the pre-polymerization initiator to participate in the pre-polymerization, and thus, may prepare a vinyl chloride-based polymer with controlled particle non-uniformity and porosity.

Therefore, the method for preparing a vinyl chloride-based polymer according to the present disclosure and the vinyl chloride-based polymer prepared thereby may be easily applied to industries in need thereof, for example, an industry related to vinyl chloride-based resins and molded articles.

BRIEF DESCRIPTION OF THE DRAWINGS

The following drawings attached herein illustrate specific embodiments of the present invention by example, and serve to enable technical concepts of the present invention to be further understood together with detailed description of the invention given below, and therefore the present invention should not be interpreted only with matters in such drawings.

MODE FOR CARRYING OUT THE INVENTION

Figure 1:
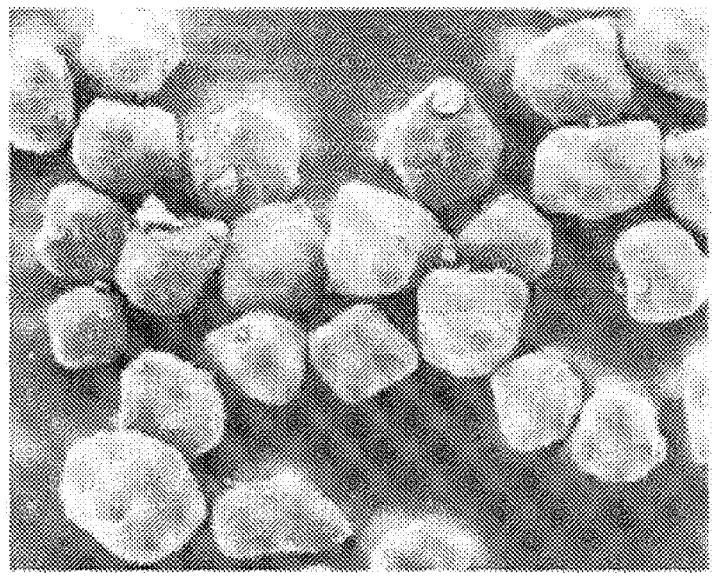
FIG. 1 is a scanning electron microscope (SEM) image showing particles of a vinyl chloride polymer prepared by a typical bulk polymerization method.
Figure 2:
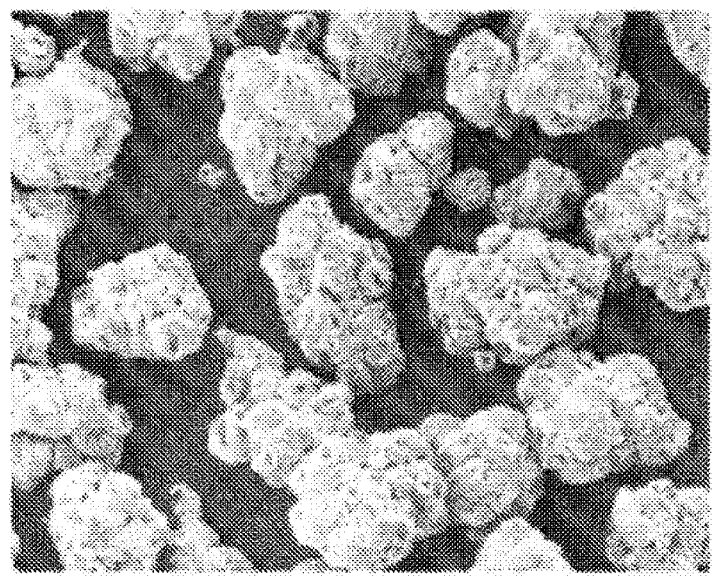
FIG. 2 is a scanning electron microscope (SEM) image showing particles of a vinyl chloride polymer prepared by a typical suspension polymerization method.

Hereinafter, the present invention will be described in more detail to facilitate understanding of the present invention.

It will be understood that words or terms used in the specification and claims of the present invention shall not be construed as being limited to having the meaning defined in commonly used dictionaries. It will be further understood that the words or terms should be interpreted as having meanings that are consistent with their meanings in the context of the relevant art and the technical idea of the invention, based on the principle that an inventor may properly define the meaning of the words or terms to best explain the invention.

The terms a 'first vinyl chloride-based monomer' and a 'second vinyl chloride-based monomer' used in the present invention are used to distinguish the order of participation in a reaction, and the substance itself may mean the same vinyl chloride-based monomer.

The term 'particle non-uniformity' used in the present invention indicates the non-uniformity of the surface of a particle, or the roughness of the surface of the particle. The standard deviation between diameters in multiple directions for 50 particles in a polymer was obtained, and the mean value of the standard deviations between diameters of each particle was defined as the particle non-uniformity. The smaller the numerical value, the smaller the standard deviation between the diameters of each particle. That is, the diameters in multiple directions of the particles having similar values indicates that the particles are close to the spherical shape, and thus, may mean the roughness of the surface of the particle is low, or smooth.

The unit "K/G (kgf/cm$^2$)" used in the present invention is a unit representing pressure, and 1 K/G may be equal to 0.968 atm.

The present invention provides a vinyl chloride-based polymer having excellent processability by controlling particle non-uniformity to improve blendability.

A vinyl chloride-based polymer according to an embodiment of the present invention may have a controlled roughness of the surface of particles forming the polymer by being prepared by the preparation method described below, and thus, may have improved blendability to have excellent processability.

Specifically, the vinyl chloride-based polymer is characterized by having a particle non-uniformity of 10 or greater defined by the Equation 1 below. More specifically, the vinyl chloride-based polymer may have a particle non-uniformity of 11 to 16.

$$\text{Particle non-uniformity } [E(X)] = \frac{1}{50} \sum_{i=1}^{50} X_i \quad \text{[Equation 1]}$$

In Equation 1 above, $X_i$ is the standard deviation of the diameter of the i-th particle, and is a value defined by Equation 2 below, $$X_i(\text{Standard deviation}) = \sqrt{\frac{\sum_{n=i}^{50} (A_n - 100)^2}{50}} \quad \text{[Equation 2]}$$

In Equation 2 above, $A_n$ is the correction value of the diameter of the i-th particle at n-th measurement, and the correction value is a value defined by Equation 3 below, and $$A_n(\text{Correction value}) = 100 \frac{D_n}{D_o} \quad \text{[Equation 3]}$$

In Equation 3 above, $D_n$ is the diameter of the i-th particle at n-th measurement, $D_0$ is the longest diameter in the i-th particle, and n is an integer of 1 to 50.

In addition, the vinyl chloride-based polymer according to an embodiment of the present invention may have a gelation rate of 50 second or more and 80 seconds or less. The vinyl chloride-based polymer according to the present invention has the above particle surface non-uniformity, and thus, may exhibit the gelation rate in the aforementioned range, thereby having excellent processability.

In this case, the gelation rate was obtained by adding 50 g of a dry mixture which has been prepared by mixing 2 parts by weight of a heat stabilizer and 2 parts by weight of epoxidized soybean oil to 100 parts by weight of a vinyl chloride-based polymer to a Brabender Torque Rhomixer and recording and measuring a mechanical load appearing when melting the dry mixture at 165° C. at 30 rpm.

In addition, the vinyl chloride-based polymer according to an embodiment of the present invention may have a porosity of 59% or more, specifically 59% to 65% or 60% to 63%, and since the plasticizer absorption rate is increased without the deterioration in mechanical properties within this range, the processability may be excellent.

Here, the porosity was calculated from the amount of mercury penetrated into each vinyl chloride polymer particle using a mercury porosity analyzer (AutoPore IV 9520, Micromeritics Co, Ltd.).

Meanwhile, the vinyl chloride-based polymer according to an embodiment of the present invention may be a bulk polymerized polymer.

Furthermore, the present invention provides a method for preparing a vinyl chloride-based polymer with the controlled surface non-uniformity of a particle.

In general, a vinyl chloride-based polymer is prepared by methods of bulk polymerization, suspension polymerization, or emulsion polymerization. Among the above, unlike the suspension polymerization or emulsion polymerization, the bulk polymerization may be performed by adding only a monomer, a polymerization initiator, and an additive if necessary, without using a medium, and thus, does not require a process after the polymerization, such as a drying process. Therefore, the bulk polymerization has low production costs and is easily applied to mass production, and thus, is widely used. However, in the case of a polymer prepared by bulk polymerization, the surface of the polymer particle has a smooth and angular shape, so that the binding force to an auxiliary raw material is low during blending when compared with a polymer prepared by suspension polymerization or emulsion polymerization in which the surface of a particle is rough. As a result, there is a problem in that processability is poor.

Therefore, the present disclosure provides a method for preparing a vinyl chloride-based polymer in which the vinyl chloride-based polymer is prepared by bulk polymerization and the shape of a particle surface is controlled by controlling the addition point of time of a polymerization initiator at the beginning of polymerization.

The method for preparing the vinyl chloride-based polymer according to an embodiment of the present invention is characterized by adding a pre-polymerization initiator to a first vinyl chloride-based monomer and performing pre-polymerization at a pressure of 8.0 K/G to 8.7 K/G to form a particle nucleus (Step 1), and performing post-polymerization on a second vinyl chloride-based monomer and a post-polymerization initiator in the presence of the particle nucleus (Step 2), wherein the pre-polymerization initiator is added at a pressure from 1.3 K/G to 3.5 K/G lower than the pressure during the pre-polymerization.

Step 1 is a pre-polymerization step for forming a particle nucleus, and may be performed by adding a pre-polymerization initiator to a first vinyl chloride-based monomer, followed by performing pre-polymerization. At this time, the pre-polymerization may be performed at a pressure of 8.0 K/G to 8.7 K/G, and the pre-polymerization initiator may be added at a pressure from 1.3 K/G to 3.5 K/G lower than the pressure during the pre-polymerization. Specifically, the pre-polymerization initiator may be added at a pressure from 1.5 K/G to 3.0 K/G lower than the pressure during the pre-polymerization.

In the case of bulk polymerization, the polymerization is performed in a manner in which the outer wall of polymer particles is generated at the beginning of the reaction and the inside thereof is filled. Therefore, in order to control the surface shape of a polymer particle to be finally produced, the control of reaction rate is necessary at the beginning of the reaction. The present invention is capable of controlling the non-uniformity and porosity of the surface of the polymer particle to an appropriate level as described above by performing the pre-polymerization at a pressure controlled to be in the above specific range, and adding a pre-polymerization initiator to a first vinyl chloride-based monomer when the pressure reaches a pressure from 1.3 K/G to 3.5 K/G lower than the pressure during the pre-polymerization.

Specifically, in Step 1 according to the present invention, a first vinyl chloride-based monomer is introduced into a reactor, and then the pressure inside the reactor is raised to a predetermined pressure between 8.0 K/G and 8.7 K/G to perform pre-polymerization. During the raising of the pressure, when the pressure reaches a pressure from 1.3 K/G to 3.5 K/G lower than the pressure during the performance of pre-polymerization, specifically 1.5 K/G to 3.0 K/G lower than the pressure during the pre-polymerization, the pre-polymerization initiator may be added.

In addition, the pre-polymerization initiator may be added in an amount of 0.01 parts by weight to 1 part by weight based on 100 parts by weight of the first vinyl chloride-based monomer, and specifically, may be added in an amount of 0.03 to 0.1 parts by weight. When the pre-polymerization initiator is added in the above range, the reaction time may be appropriately controlled while the polymerization reaction may be smoothly initiated. In addition, since the heat of a reactant may be maintained at an appropriate level, the deterioration of stability due to reaction heat may be prevented and problems such as the deterioration in thermal stability due to a residual initiator may be minimized.

Also, the pre-polymerization initiator is not particularly limited. For example, a compound of peroxyester or peroxydicarbonate, and the like may be used. Specifically, the pre-polymerization initiator may be one or more selected from di-2-ethylhexyl peroxydicarbonate, t-butylperoxy neodecanoate, t-butylperoxy ester, cumyl peroxy ester, cumyl peroxy neodecanoate, 1,1,3,3-tetramethyl butyl peroxy neodecanoate, t-hexyl peroxy neodecanoate, t-hexyl peroxy pivalate, t-butyl peroxy pivalate, di-sec-butyl peroxy dicarbonate, di-2-ethoxyethyl peroxy dicarbonate, isobutyryl peroxide, 3,5,5-trimethylhexanoyl peroxide, lauryl peroxide, and octylperoxy dicarbonate.

In addition, the first vinyl chloride-based monomer may be a vinyl chloride monomer or a mixture of a vinyl chloride monomer and a vinyl-based monomer having a copolymerizability with the vinyl chloride monomer. When the first vinyl chloride monomer is mixture of a vinyl chloride monomer and a vinyl-based monomer, the mixture may be used in an appropriate amount such that 50% or greater of vinyl chloride is included in a vinyl chloride-based polymer prepared therethrough.

The vinyl-based monomer is not particularly limited. For example, olefin compounds such as ethylene, propylene, and butene; vinyl esters such as vinyl acetate, vinyl propionate and vinyl stearate; unsaturated nitriles such as acrylonitrile; vinyl alkyl ethers such as vinyl methyl ether, vinyl ethyl ether, vinyl octyl ether and vinyl lauryl ether; vinylidene halides such as vinylidene chloride; unsaturated fatty acids such as acrylic acid, methacrylic acid, itaconic acid, maleic acid, fumaric acid, maleic anhydride and itaconic anhydride and an anhydride of the fatty acids; unsaturated fatty acid esters such as methyl acrylate, ethyl acrylate, monomethyl maleate, dimethyl maleate, and butylbenzyl maleate; cross-linkable monomers such as diallyl phthalate. Any one thereof or a mixture of two or more thereof may be used as the vinyl-based monomer.

Meanwhile, the pre-polymerization of Step 1 may be performed up to a polymerization conversion rate of 10% to 15%. The polymerization conversion rate of the pre-polymerization of Step 1 is not particularly limited. However, the pre-polymerization is a step for preparing a particle nucleus, and when the pre-polymerization is excessively performed so that the particle nucleus is excessively formed, the physical properties of a polymer to be finally produced may be modified different from an intended purpose. Therefore, there is a need to control the degree of polymerization of the pre-polymerization. If the pre-polymerization is performed up to the above polymerization conversion rate, a vinyl chloride-based polymer having a desired non-uniformly may be produced without excessively forming a particle nucleus, while not affecting the degree of polymerization and other physical properties.

At this time, the polymerization conversion rate represents a conversion rate of a first vinyl chloride monomer into a polymer, and may be measured using a butane tracer equipped with gas chromatography. Specifically, the polymerization conversion rate may be a value obtained by drawing a polymerization conversion rate curve according to the ratio of a vinyl chloride monomer to butane over time under predetermined polymerization conditions whenever each polymerization condition is met, and measuring a polymerization conversion rate according to the polymerization conditions on the basis thereof. In addition, the polymerization conversion rate may be to include even an error range according to the measurement.

In addition, the pre-polymerization may be performed under the temperature range conditions of 30° C. to 70° C.

Step 2 is a step for preparing a vinyl chloride-based polymer by growing the inside of a particle nucleus prepared in the pre-polymerization, and may be performed by performing post-polymerization on a second vinyl chloride-based monomer and a post-polymerization initiator in the presence of the particle nucleus prepared in the pre-polymerization step.

In this case, the post-polymerization may be performed at a pressure of 6 K/G to 13 K/G.

The second vinyl chloride-based monomer may be the same as the first vinyl chloride-based monomer.

The post-polymerization initiator may be added in an amount of 0.05 parts by weight to 2 part by weight based on 100 parts by weight of the second vinyl chloride-based monomer, and specifically, may be added in an amount of 0.1 parts by weight to 0.5 parts by weight.

Also, the post-polymerization initiator is not particularly limited. For example, the post-polymerization initiator may be one or more selected from di-2-ethylhexyl peroxydicarbonate, t-butylperoxy neodecanoate, t-butylperoxy ester, cumyl peroxy ester, cumyl peroxy neodecanoate, 1,1,3,3-tetramethyl butyl peroxy neodecanoate, t-hexyl peroxy neodecanoate, t-hexyl peroxy pivalate, t-butyl peroxy pivalate, di-sec-butyl peroxy dicarbonate, di-2-ethoxyethyl peroxy dicarbonate, isobutyryl peroxide, 3,5,5-trimethylhexanoyl peroxide, lauryl peroxide, and octylperoxy dicarbonate. Meanwhile, the post-polymerization initiator may be the same as or different from the pre-polymerization initiator.

In addition, the post-polymerization may be performed under the temperature range conditions of 30° C. to 70° C.

Meanwhile, the preparation method according to an embodiment of the present invention may remove the reactivity of a residual post polymerization initiator by adding a polymerization inhibitor at the end of the post-polymerization. At this time, the polymerization inhibitor is not particularly limited, but for example, hydroquinone, butylated hydroxy toluene, monomethyl ether hydroquinone, quaternary butyl catechol, diphenylamine, triisopropanol amine, triethanol amine, and the like may be used. Also, the polymerization inhibitor may be used in an appropriate amount depending on the amount of residual post-polymerization initiator. Typically, the polymerization inhibitor may be used in an amount of 0.001 parts by weight to 0.1 parts by weight based on 100 parts by weight of the total vinyl chloride-based monomer used in pre-polymerization and post-polymerization.

In addition, the preparation method may use a reaction medium if necessary, and may further use an additive such as a molecular weight regulator.

The reaction medium is not particularly limited, and a typical organic solvent may be used. For example, aromatic compounds such as benzene, toluene, and xylene, methyl ethyl ketone, acetone, n-hexane, chloroform, cyclohexane, and the like may be used.

The molecular weight regulator is not particularly limited, and for example, n-butyl mercaptan, n-octyl mercaptan, n-dodecyl mercaptan, t-dodecyl mercaptan, and the like may be used.

Hereinafter, the present invention will be described in more detail with reference to Examples and Experimental Examples. However, the following Examples and Experimental Examples are merely illustrative of the present invention, and are not intended to limit the scope of the present invention.

Example 1

135 kg of a vinyl chloride monomer was added to a pre-polymerization reactor having a volume of 0.2 m$^3$ degassed by high vacuum, and while stirring, the pressure was raised to 8 K/G to perform polymerization up to a polymerization conversion rate of 10% to prepare a particle nucleus. At this time, during the raising of the pressure, when the internal pressure of the reactor reached 6.5 K/G, 40 g of di-2-ethylhexyl peroxydicarbonate (OPP) was added to participate in the reaction.

Thereafter, 75 kg of a vinyl chloride monomer was added to a post-polymerization reactor of 0.5 m$^3$, and the prepared particle nucleus was transferred thereto. When the internal pressure of the reactor was 4 K/G, 95 g of 1,1,3,3-tetramethyl butyl peroxy neodecarbonate (OND) was added thereto and stirred while raising the pressure to perform polymerization for 180 minutes at a pressure of 8 K/G. When the polymerization was completed, while stirring, unreacted vinyl chloride monomer remaining in vacuum for 30 minutes was recovered and a vinyl chloride polymer was prepared.

Example 2

A vinyl chloride polymer was prepared in the same manner as in Example 1, except that di-2-ethylhexyl peroxydicarbonate was added at the time when 5 K/G was reached.

Example 3

A vinyl chloride polymer was prepared in the same manner as in Example 1, except that pre-polymerization was performed at 8.7 K/G and di-2-ethylhexyl peroxydicarbonate was added at the time when 6.7 K/G was reached.

Example 4

A vinyl chloride polymer was prepared in the same manner as in Example 1, except that 95 g of 1,1,3,3-tetramethyl butyl peroxy neodecarbonate (OND) was added together with a vinyl chloride monomer during post-polymerization.

Comparative Example 1

A vinyl chloride polymer was prepared in the same manner as in Example 1, except that pre-polymerization was performed at 12 K/G.

Comparative Example 2

A vinyl chloride polymer was prepared in the same manner as in Example 1, except that di-2-ethylhexyl peroxydicarbonate was added at the time when 7 K/G was reached. However, the polymer was not prepared since a normal particle nucleus was not produced. This is the result indicating that the addition of di-2-ethylhexyl peroxydicarbonate was late, so that dispersion was not sufficiently achieved.

Comparative Example 3

A vinyl chloride polymer was prepared in the same manner as in Example 1, except that di-2-ethylhexyl peroxydicarbonate was added at the time when 4 K/G was reached.

Comparative Example 4

A vinyl chloride polymer was prepared in the same manner as in Example 1, except that pre-polymerization was performed at 10 K/G and di-2-ethylhexyl peroxydicarbonate was added at the time when 8.5 K/G was reached.

Comparative Example 5

A vinyl chloride polymer was prepared in the same manner as in Example 1, except that pre-polymerization was performed at 7 K/G and di-2-ethylhexyl peroxydicarbonate was added at the time when 5.5 K/G was reached. However, the polymer was not prepared since a normal particle nucleus was not produced. this is a result indicating that the pressure was too low during the pre-polymerization, so that the polymerization was not performed in a normal manner.

Comparative Example 6

A vinyl chloride polymer was prepared in the same manner as in Example 1, except that pre-polymerization was performed at 10 K/G and di-2-ethylhexyl peroxydicarbonate was added at the time when 6.5 K/G was reached.

Comparative Example 7

A vinyl chloride polymer was prepared in the same manner as in Example 1, except that pre-polymerization was performed at 9.5 K/G and di-2-ethylhexyl peroxydicarbonate was added at the time when 8 K/G was reached.

Comparative Example 8

A vinyl chloride polymer was prepared in the same manner as in Example 1, except that pre-polymerization was performed at 9.5 K/G.

Comparative Example 9

A vinyl chloride polymer was prepared in the same manner as in Comparative Example 1, except that 1,1,3,3-tetramethyl butyl peroxy neodecarbonate was added at the time when 5.5 K/G was reached during post-polymerization.

Comparative Example 10

A vinyl chloride polymer was prepared in the same manner as in Comparative Example 1, except that post-polymerization was performed at 7 K/G.

Experimental Example 1

The non-uniformity of a particle surface, degree of polymerization, and porosity (%) of the vinyl chloride polymer prepared in each of Examples 1 to 4 and Comparative Examples 1 to 10 were measured. The results are shown in Table 1 below.

(1) Particle Non-Uniformity

The particle non-uniformity was measured by measuring the longest diameter per particle for a total of 50 particles among particles observed using an optical microscope for each polymer surface, measuring 50 diameters passing through the center thereof, and calculating through Equation 1 to Equation 3 below. That is, using the longest diameter for each of the 50 particles and the 50 diameters passing through the center thereof, the diameter standard deviation of each particle was calculated using Equations 2 and 3, and the average of the calculated 50 diameter standard deviations was represented as the particle non-uniformity.

$$\text{Particle non-uniformity } [E(X)] = \frac{1}{50}\sum_{i=1}^{50} X_i \qquad \text{[Equation 1]}$$

In Equation 1 above, $X_i$ is the standard deviation of the diameter of the i-th particle, and is a value defined by Equation 2 below, $$X_i(\text{Standard deviation}) = \sqrt{\frac{\sum_{n=i}^{50}(A_n - 100)^2}{50}} \qquad \text{[Equation 2]}$$

In Equation 2 above, $A_n$ is the correction value of the diameter of the i-th particle at n-th measurement, and the correction value is a value defined by Equation 3 below, and $$A_n(\text{Correction value}) = 100\frac{D_n}{D_o} \qquad \text{[Equation 3]}$$

In Equation 3 above, $D_n$ is the diameter of the i-th particle at n-th measurement, $D_0$ is the longest diameter of the i-th particle, and n is an integer of 1 to 50.

(2) Degree of Polymerization

The degree of polymerization was measured according to ASTM D1 243-49.

(3) Porosity (%)

The porosity was calculated from the amount of mercury penetrated into each vinyl chloride polymer particle using a mercury porosity analyzer (AutoPore IV 9520, Micromeritics Co, Ltd.).

TABLE 1

| Classification | Pressure (K/G) | | | | Degree of polymerization | Non-uniformity | Porosity (%) |
|---|---|---|---|---|---|---|---|
| | Pre-polymerization initiator added | Pre-polymerization | Post-polymerization initiator added | Post-polymerization | | | |
| Example 1 | 6.52 | 854 | 4 | 8 | 1000 | 15.82 | 60.54 |
| Example 2 | 5 | 8 | 4 | 8 | 1020 | 13.56 | 60.11 |
| Example 3 | 6.7 | 8.7 | 4 | 8 | 990 | 13.05 | 59.63 |
| Example 4 | 6.5 | 8 | — | 8 | 1005 | 12.74 | 59.21 |
| Comparative Example 1 | 6.5 | 12 | 4 | 8 | 1000 | 3.45 | 56.09 |
| Comparative Example 2 | 7 | 8 | 4 | 8 | — | — | — |
| Comparative Example 3 | 4 | 8 | 4 | 8 | 1010 | 9.14 | 57.13 |
| Comparative Example 4 | 8.5 | 10 | 4 | 8 | 1000 | 7.61 | 56.84 |
| Comparative Example 5 | 5.5 | 7 | 4 | 8 | — | — | — |
| Comparative Example 6 | 6.5 | 10 | 4 | 8 | 990 | 6.85 | 56.71 |
| Comparative Example 7 | 8 | 9.5 | 4 | 8 | 1020 | 8.01 | 56.81 |
| Comparative Example 8 | 6.5 | 9.5 | 4 | 8 | 1000 | 8.82 | 56.19 |
| Comparative Example 9 | 6.5 | 12 | 5.5 | 8 | 1000 | 4.12 | 56.32 |
| Comparative Example 10 | 6.5 | 12 | 4 | 7 | 1240 | 4.58 | 56.30 |

As shown in Table 1, the vinyl chloride polymer of each of Example 1 to Example 4 according to an embodiment of the present invention exhibited an equal level of degree of polymerization, had a rough surface having a particle non-uniformity of 10 or greater, and had an increased porosity. On the other hand, the vinyl chloride polymer of each of Comparative Example 1, Comparative Example 3, Comparative Example 4, and Comparative Example 6 to Comparative Example 10 had a smooth surface with a particle non-uniformity of less than 10, and had a porosity significantly reduced when compared to that of Examples 1 to 4. In addition, in the case of Comparative Example 2 and Comparative Example 5, a polymer was not produced.

Specifically, in the case of Comparative Example 1, Comparative Example 4, and Comparative Examples 6 to 10 in which polymerization was performed at a pressure higher than 8.7 K/G during pre-polymerization, the non-uniformity was significantly lower than that of Examples 1 to 4. Particularly, in the case of Comparative Example 4, Comparative Example 7, and Comparative Example 8, even though the pre-polymerization initiator was added at 1.5 K/G or 3.0 K/G, which is lower when compared to the pressure during the polymerization, a polymer having a smooth particle surface was produced. This is a result indicating that when the pressure is too high during pre-polymerization, the outer shape of an initial particle is formed rapidly and smoothly, so that the non-uniformity of the particle surface may not be controlled beyond a predetermined range.

In addition, in the case of Comparative Example 3 in which the pre-polymerization initiator was added at −4 K/G when compared to the pressure during pre-polymerization, the surface non-uniformity of a particle was lower than that of Examples 1 to 4. This indicates that when a pre-polymerization initiator is added too fast, the dispersion and activation time of the pre-polymerization initiator is lengthened, so that the outer shape of an initial particle may be formed rapidly and smoothly, and as a result, the non-uniformity of the particle surface may not be controlled beyond a predetermined range.

In addition, Comparative Examples 1, 3 to 4, and 7 and 8 had a significantly reduced porosity of particles when compared to that of Examples 1 to 4 by about 4% to 8%. Through the above, it was confirmed that the preparation method of the present invention in which the pressure and the addition point of time of a pre-polymerization initiator were controlled may develop pores in the particles, thereby producing a vinyl chloride polymer having excellent pore properties.

Meanwhile, in the case of Comparative Example 9 and Comparative Example 10, in order to confirm the change in the particle non-uniformity according to the conditions during post-polymerization, pre-polymerization was performed in the same manner as in Comparative Example 1 but the post-polymerization addition point of time and the post-polymerization pressure were changed during post-polymerization. In the case of Comparative Example 9, a post-polymerization initiator was added at −2.5 K/G when compared to during the post-polymerization. However, the particle non-uniformity was not controlled. In the case of Comparative Example 10, the particle non-uniformity was not controlled but the degree of polymerization was greatly increased. Through the above, it was confirmed that the surface non-uniformity of polymer particles to be finally produced may be controlled by controlling the pre-polymerization pressure and the addition time of a polymerization initiator during pre-polymerization. It was also confirmed that the control of pressure and addition time of a post-polymerization initiator during post-polymerization may rather act as a factor hindering the preparation of a desired polymer.

Experimental Example 2

The blendability, plasticizer absorption rate, protrusion properties, and gelation rate of the vinyl chloride-based polymer of each of Examples and Comparative Examples were measured. The results are shown in Table 2 below.

Meanwhile, in the case of Comparative Example 2 and Comparative Example 5, a polymer was not produced, and thus the physical properties could not be measured.

(1) Blendability 100 g of the vinyl chloride polymer of each of Examples and Comparative Examples, 6 g of Ca—Zn thermal stabilizer, 7 g of acrylic impact modifier, 4 g of liposaccharide (titanium dioxide), and 30 g of calcium carbonate were added to the Brabender Planetary Mixer, followed by blending at 120° C. for 12 minutes to obtain powder. The powder was passed through a mesh of 35 mesh to measure the residual amount of the powder, and the ratio (weight %)) of the residual amount to 100 wt % of the total powder was represented by a blendability value. At this time, the lower the ratio of the residual amount, the more excellent the blendability.

(2) Gelation Rate 50 g of a mixed powder in which 100 parts by weight of the vinyl chloride polymer of each of Examples and Comparative Examples, 3 parts by weight of Ca—Zn heat stabilizer, and 2 parts by weight of epoxidized soybean oil were added to a Brabender Planetary Mixer, followed by melting at 165° C. at 30 rpm. The resulting mechanical load was recorded and represented as gelation rate. At this time, the smaller value the gelation rate, the better the processability.

(3) Plasticizer Absorption Rate (CPA, wt %)

According to ASTM D3367-98, each of the vinyl chloride polymers of Examples and Comparative Examples was mixed with dioctyl phthalate (DOP), and the plasticizer absorption rate was measured by calculating the same with Equation 4 below.

$$\text{Plasticizer absorption rate (wt \%)} = [(B-A)/A] \times 100 \quad \text{[Equation 4]}$$

In Equation 4, A is the weight of the vinyl chloride polymer, B is the weight of the vinyl chloride polymer which absorbed a plasticizer after being mixing with the plasticizer.

(4) Protrusion Properties 100 parts by weight of the vinyl chloride polymer of each of Examples and Comparative Examples, 45 parts by weight of DOP, 0.1 parts by weight of barium stearate, 0.2 parts by weight of tin-based stabilizer, and 0.1 parts by weight of carbon black were mixed and kneaded for 4 minutes using a 6-inch roll at 145° C. Thereafter, a sheet having a thickness of 0.3 mm was prepared and visually observed to count white transparent particles in 400 cm² of the sheet, and the counted white transparent particles were represented as protrusion properties. The smaller the number of white transparent particles, the more excellent the protrusion properties, and consequently, the better the surface properties.

TABLE 2

| Classification | Blendability | Gelation rate (s) | Plasticizer absorption rate (wt %) | Protrusion properties (numbers) |
| --- | --- | --- | --- | --- |
| Example 1 | 2.7 | 68 | 36.8 | 2 |
| Example 2 | 2.8 | 76 | 36.5 | 1 |
| Example 3 | 3.0 | 76 | 35.2 | 2 |
| Example 4 | 3.0 | 73 | 35.2 | 2 |
| Comparative Example 1 | 6.3 | 212 | 30.7 | 18 |
| Comparative Example 2 | — | — | — | — |
| Comparative Example 3 | 5.2 | 136 | 32.6 | 11 |
| Comparative Example 4 | 5.5 | 144 | 31.1 | 14 |
| Comparative Example 5 | — | — | — | — |
| Comparative Example 6 | 5.8 | 156 | 31.2 | 15 |
| Comparative Example 7 | 5.5 | 139 | 31.4 | 12 |
| Comparative Example 8 | 5.4 | 136 | 30.7 | 12 |
| Comparative Example 9 | 6.2 | 180 | 29.9 | 16 |
| Comparative Example 10 | 6.0 | 180 | 30.5 | 19 |

As it was confirmed through Table 2 above, the vinyl chloride polymer of each of Examples 1 to 4 according to an embodiment of the present invention has a gelation rate reduced by more than half while the blendability was more than two times better than the vinyl chloride polymer of Comparative Examples. In addition, the plasticizer absorption rate was greatly increased and the generation of protrusions was greatly reduced. Through the above, it was confirmed that in the case of the vinyl chloride-based polymer prepared by the preparation method according to the present invention in which the pressure conditions of the pre-polymerization step and the addition time of the pre-polymerization initiator were controlled, the particle non-uniformity and porosity were controlled so that the gelation rate may be reduced and the plasticizer absorption rate may be increased, and thus, the blendability was excellent to exhibit greatly improved processability.

The invention claimed is:

1. A vinyl chloride-based polymer having a particle non-uniformity of 10 or more defined by Equation 1, $$\text{Particle non-uniformity } [E(X)] = \frac{1}{50}\sum_{i=1}^{50} X_i \quad \text{[Equation 1]}$$

in Equation 1, $X_i$ is the standard deviation of the diameter of the i-th particle, and is a value defined by Equation 2, $$X_i(\text{Standard deviation}) = \sqrt{\frac{\sum_{n=i}^{50}(A_n - 100)^2}{50}} \quad \text{[Equation 2]}$$

in Equation 2, $A_N$ is the correction value of the diameter of the i-th particle at n-th measurement, and the correction value is a value defined by Equation 3, $$A_n(\text{Correction value}) = 100\frac{D_n}{D_o} \quad \text{[Equation 3]}$$

in Equation 3, $D_n$ is the diameter of the i-th particle at n-th measurement, $D_0$ is the longest diameter of the i-th particle, and n is an integer of 1 to 50.

2. The vinyl chloride-based polymer of claim 1, wherein the vinyl chloride-based polymer has the particle non-uniformity of 11 to 16.

3. The vinyl chloride-based polymer of claim 1, wherein the vinyl chloride-based polymer is a bulk polymerized polymer.

4. The vinyl chloride-based polymer of claim 1, wherein the vinyl chloride-based polymer has a porosity of 59% or greater.

5. A method for preparing a vinyl chloride-based polymer, the method comprising:

adding a pre-polymerization initiator to a first vinyl chloride-based monomer and performing pre-polymerization at a pressure in the range of 8.0 K/G to 8.7 K/G to form a particle nucleus; and performing post-polymerization on a second vinyl chloride-based monomer and a post-polymerization initiator in the presence of the particle nucleus, the pre-polymerization initiator is added at a pressure from 1.3 K/G to 3.5 K/G lower than the pressure during the pre-polymerization, and wherein the vinyl chloride-based polymer has a particle non-uniformity of 10 or more defined by Equation 1:

$$\text{Particle non-uniformity } [E(X)] = \frac{1}{50}\sum_{i=1}^{50} X_i \quad \text{[Equation 1]}$$

in Equation 1, $X_i$ is the standard deviation of the diameter of the i-th particle, and is a value defined by Equation 2, $$X_i(\text{Standard deviation}) = \sqrt{\frac{\sum_{n=i}^{50}(A_n - 100)^2}{50}} \quad \text{[Equation 2]}$$

in Equation 2, $A_n$ is the correction value of the diameter of the i-th particle at n-th measurement, and the correction value is a value defined by Equation 3, $$A_n(\text{Correction value}) = 100\frac{D_n}{D_o} \quad \text{[Equation 3]}$$

in Equation 3, $D_n$ is the diameter of the i-th particle at n-th measurement, $D_0$ is the longest diameter of the i-th particle, and n is an integer of 1 to 50.

6. The method of claim 5, wherein the pre-polymerization initiator is added at a pressure from 1.5 K/G to 3.0 K/G lower than the pressure during the pre-polymerization.

7. The method of claim 5, wherein the pre-polymerization initiator is added in an amount of 0.01 to 1 part by weight based on 100 parts by weight of the first vinyl chloride-based monomer.

8. The method of claim 5, wherein the pre-polymerization is performed up to a polymerization conversion rate of 10% to 15%.

9. The method of claim 5, wherein the post-polymerization is performed at a pressure of 6 K/G to 13 K/G.

10. The method of claim 5, wherein the post-polymerization initiator is used in an amount of 0.05 to 2 parts by weight based on 100 parts by weight of the second vinyl chloride-based monomer.

11. The method of claim 5, wherein each of the pre-polymerization initiator and the post-polymerization initiator includes one or more selected from di-2-ethylhexyl peroxydicarbonate, t-butylperoxy neodecanoate, t-butylperoxy ester, cumyl peroxy ester, cumyl peroxy neodecanoate, 1,1,3,3-tetramethyl butyl peroxy neodecanoate, t-hexyl peroxy neodecanoate, t-hexyl peroxy pivalate, t-butyl peroxy pivalate, di-sec-butyl peroxy dicarbonate, di-2-ethoxyethyl peroxy dicarbonate, isobutyryl peroxide, 3,5,5-trimethylhexanoyl peroxide, lauryl peroxide, and octylperoxy dicarbonate.

* * * * *